(12) United States Patent
Rieken

(10) Patent No.: US 7,003,015 B2
(45) Date of Patent: Feb. 21, 2006

(54) APPARATUS AND METHOD FOR CONFIGURABLE MULTI-DWELL SEARCH ENGINE FOR SPREAD SPECTRUM APPLICATIONS

(75) Inventor: Keith Rieken, Cupertino, CA (US)

(73) Assignee: Infineon Technologies AG, Munich (DE)

( * ) Notice: Subject to any disclaimer, the term of this patent is extended or adjusted under 35 U.S.C. 154(b) by 881 days.

(21) Appl. No.: 09/919,700

(22) Filed: Jul. 31, 2001

(65) Prior Publication Data

US 2002/0015435 A1 Feb. 7, 2002

Related U.S. Application Data

(60) Provisional application No. 60/222,022, filed on Jul. 31, 2000.

(51) Int. Cl.
*H04B 1/69* (2006.01)
(52) U.S. Cl. ..................................................... 375/130
(58) Field of Classification Search ................ 375/130, 375/132, 133, 134, 136, 137, 140, 141, 142, 375/145, 147, 149, 150, 316, 354, 359, 362, 375/365, 368, 371, 377; 341/111, 112
See application file for complete search history.

(56) References Cited

U.S. PATENT DOCUMENTS

| | | | |
|---|---|---|---|
| 5,440,597 A * | 8/1995 | Chung et al. | ................ 375/149 |
| 5,544,357 A | 8/1996 | Huei | |
| 5,953,382 A | 9/1999 | Asano et al. | |
| 6,788,708 B1 * | 9/2004 | Rainish et al. | ............... 370/479 |

* cited by examiner

*Primary Examiner*—Mohammed Ghayour
*Assistant Examiner*—Pankaj Kumar
(74) *Attorney, Agent, or Firm*—Darby & Darby

(57) ABSTRACT

This invention provides a configurable multi-dwell search engine for performing automated efficient searches of a known code sequence space. Inputs from a multi-dwell table and a finger control table are multiplexed by a first multiplexer. Output from the first multiplexer is used to generate a threshold comparison signal. The generated threshold comparison signal, the current dwell state signal and inputs from a next dwell look-up table are multiplexed by a second multiplexer. The second multiplexer outputs a hard hit signal and a offset control signal.

8 Claims, 3 Drawing Sheets

APPARATUS AND METHOD FOR CONFIGURABLE MULTI-DWELL SEARCH ENGINE FOR SPREAD SPECTRUM APPLICATIONS

PRIORITY INFORMATION

This application claims priority from the Provisional Application entitled "Method and Apparatus for Configurable Multi-Dwell Search Engine for CDMA Applications", U.S. Ser. No. 60/222,022, filed on Jul. 31, 2000.

CROSS REFERENCE TO RELATED APPLICATION

Related applications are:

"Generic Finger Architecture for Spread Spectrum Applications", filed concurrently herewith, having U.S. Ser. No. 09/920,094, now U.S. Pat. No. 6,459,883;

"Apparatus and Methods for Sample Selection and Reuse of Rake Fingers in Spread Spectrum Systems", filed concurrently herewith, and having U.S. Ser. No. 09/920,095; and "Method and Apparatus for Time-Sliced and Multi-Threaded Data Processing in a Communication System", filed concurrently herewith, and having U.S. Ser. No. 09/920,093.

Each of these applications is incorporated herein by reference.

BACKGROUND OF THE INVENTION

This invention relates generally to wireless communication systems.

Wireless communication has extensive applications in consumer and business markets. Among the many communication applications/systems are: mobile wireless, fixed wireless, unlicensed Federal Communications Commission (FCC) wireless, local area network (LAN), cordless telephony, personal base station, telemetry, and others. The applications/systems are not limited to spread spectrum systems.

Signal processing protocols and standards have proliferated with advances in wireless communications devices and services. Current communications protocols include Frequency Division Multiplexing (FDM), Time Division Multiple Access (TDMA), and Code Division Multiple Access (CDMA). The United States, Europe, Japan, and Korea have all developed their own standards for each communications protocol. TDMA standards include interim Standard-136 (IS-136), Global System for Mobile (GSM), and General Packet Radio Service (GPRS). CDMA standards include Global Positioning System (GPS), Interim Standard-95 (IS-95) and Wide Band CDMA (WCDMA). Wireless communications services include paging, voice and data applications.

In many cases, within the same field of applications, different systems use incompatible modulation techniques and protocols. Consequently, each system may require unique hardware, software, and methodologies for baseband processing. This practice can be costly in terms of design, testing, manufacturing, and infrastructure resources. As a result, a need arises to overcome the limitations associated with the varied hardware, software, and methodology of processing digital signals in each of the varied applications.

Until recently wireless communications devices supported a single communications standard. In theory, however, a wireless communications device can be designed using a general purpose Digital Signal Processor (DSP) that would be programmed first to realize a set of functional blocks specifying the minimum performance requirements for a first application and can be reprogrammed to realize a second set of functional blocks to provide a second application. To achieve these minimum performance requirements, system designers design algorithms (sequences of arithmetic, trigonometric, logic, control, memory access, indexing operations, and the like) to encode, transmit, and decode signals. These algorithms are typically specified in software. The set of algorithms which achieve the target performance specification is collectively referred to as the executable specification. This executable specification can then be compiled and run on the DSP, typically via the use of a compiler. Despite the increasing computational power and speeds of general purpose DSPs and decreasing memory cost and size, designers have not been able to satisfy cost, power, and speed requirements simply by programming a general purpose DSP with the executable specification for a standard-specific application.

Additional dedicated high-speed processing is required, a need which has traditionally been met using an application-specific processor. As used herein, an application-specific processor is a processor that excels in the efficient execution (power, area, flexibility) of a set of algorithms tailored to the application. An application-specific processor, however, fares extremely poorly for algorithms outside the intended application space. In other words, the improved speed and power efficiency of application-specific-processors comes at the cost of function flexibility.

Demand is now growing for wireless communications devices that support multiple applications and varying grades of services over multiple standards. Today's solution to this problem is essentially to connect multiple application-specific processors together to obtain multi-standard operation, thereby adding cost in terms of design resources, design time, and silicon area. In particular, demand is growing for cellular handsets, which is one type of wireless communications device, to support multiple applications and services over multiple standards.

Cellular handsets, including PCS (Personal Communications Services) and 3-G (Third Generation) handsets, need to acquire certain cell specific information and characteristics before negotiating a service with a base station. For this purpose, each base station transmits certain cell specific information (e.g., a pilot signal) necessary for a user to acquire services such as paging or cellular telephony from the base station. For example, in CDMA systems, the cell specific information is contained in pilot and/or synchronization channels. The pilot and/or synchronization channels are spread with cell specific pseudo-random or gold code sequences, which form the basis for frame, slot, and bit timing synchronization for a handset.

To acquire cellular service, a cellular handset must be capable of searching for a base station. Typically, a handset performs two types of searches, namely, access search and directed search. The access search is generally performed at power-up, where the handset searches for the pilot signal to identify the base station in the geographic area. During an access search, the search area is limited by the maximum distance associated with a base station radius. Once a base station is identified, the handset periodically performs directed searches to establish multi-path updates. During a directed search, the general location of the base station is known; thus, the directed search is conducted within a hypothesis area, which is smaller than the access search area.

In similar fashion, a base station searches for the handsets in its service area.

As might be expected, it is desirable to reduce search time for a cellular handset to acquire service. Dwell state algorithms are methods to reduce search time. In a typical dwell state algorithm, a search is binned according to energy values or thresholds. An auto-correlation function at a given integration length is performed for all energy values that are high enough to be distinguished from the noise floor with a high degree of accuracy. As the search progresses, the integration length and the threshold value generally progresses to a higher value. Typically, the longer the integration length, the more reliable the result but the longer the search time. Thus, it is desirable to reduce search time yet still provide reliable search results.

One of the primary concerns when designing a searcher to perform search functions is to achieve an optimal balance between configuration flexibility and performance level. Typically, a searcher having very high configuration flexibility, such as a DSP, yields low performance throughput. In time-sliced architecture, a search engine is typically running at a clock speed much greater than chip rate of the logical device; thus, a higher performance is desired to quickly update state machine implementations of dwell states. A searcher implemented on an application specific integrated circuit (ASIC) is typically able to yield high performance throughput. ASIC searchers, however, generally have very limited or no configuration flexibility.

Accordingly, it is desirable to provide a multi-dwell search engine that provides a sufficient amount of configuration flexibility yet yielding a high performance throughput. It is further desirable to provide a multi-dwell search engine that reduces search time while providing reliable search results.

SUMMARY OF THE INVENTION

This invention provides a configurable multi-dwell search engine for performing automated efficient searches of a known code sequence space. Look-up tables are leveraged for providing programmable, realtime, multi-dwell searching techniques to minimize overhead. In an exemplary embodiment, the multi-dwell search engine is implemented in a multi-threaded time-sliced processing environment. Advantages provided by this search engine include: (1) increasing flexibility in defining dwell states and associated integration lengths; (2) improving realtime control of chip rate processing search fingers; (3) providing support for a multi-threaded searching environment that shares search strategies; (4) minimizing control bandwidth to higher layers of search algorithms; and providing high performance at low power consumption relative to comparable ASIC based solutions.

This invention may be implemented to perform virtually any search function in a spread spectrum system, where a search engine slews the code relative to data to obtain timing offsets and multi-path echoes.

DETAILED DESCRIPTION OF THE INVENTION

Figure 1:
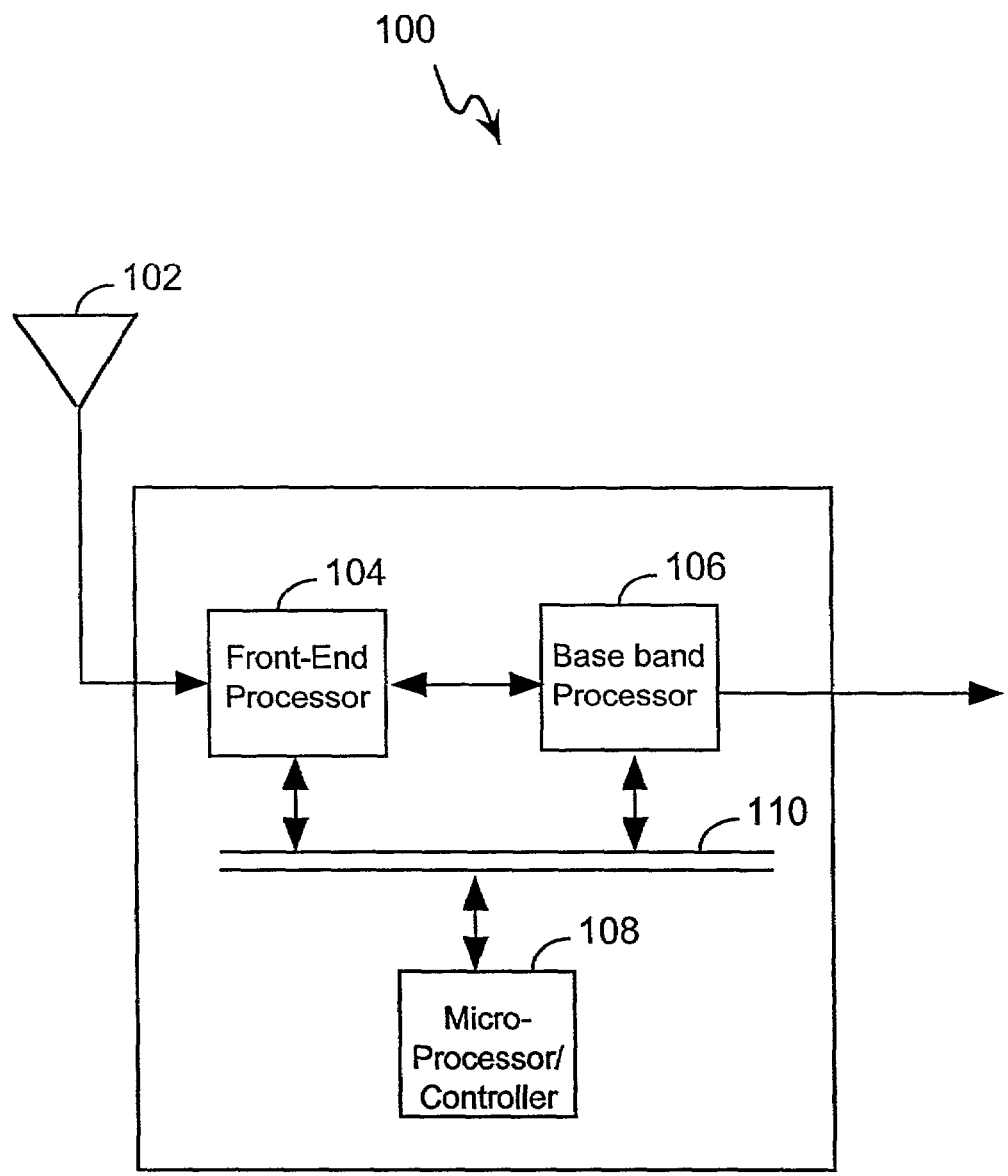
FIG. 1 is a block diagram of a prior art communication device.

FIG. 1 illustrates a prior art communication device 100. The communication device 100 includes an antenna 102, a front-end processor 104, a base band processor 106, a microprocessor/controller 108, and a bus for interconnecting the front-end processor 104, the base based processor, and a microprocessor/controller 108. The microprocessor 108 supports the exchange of data and/or instructions to the other components of the communication device 100. The base band processor 106 is coupled to the front-end processor 104 to receive and transmit data. The communication device 100 may be a mobile handset, a test platform, an embedded modem, or other communication devices in other code-dependent applications.

The front-end processor 104 is coupled to the antenna 102 to receive data. The front-end processor 104 includes components and performs functions that are known to those skilled in the art. These components are not shown in the front-end processor 104 for purposes of clarity.

After data has been processed by the front-end processor, data is input into the base band processor 106. In spread spectrum systems, the base band processor 106 typically includes a despreading circuit, such as a receiver, for despreading data. To properly receive encoded data, a receiver has to be able to identify, despread, and decode the signal. At a receiver, despreading (i.e., multiplication by the same binary spreading waveform as at the transmitter) and removal of the carrier modulation, restore the original baseband data waveform. A receiver using a bank of despreaders may be called a "rake receiver," where each despreader may be referred to as a "rake finger." Each reuse of rake finger hardware to process a different path or a path of a different data channel is referred to as using a "virtual finger." The ratio of the maximum number of virtual fingers to physical fingers is a function of the ratio of the maximum logic speed (or chipping rate) to sampling rate (or clock rate).

Figure 2:
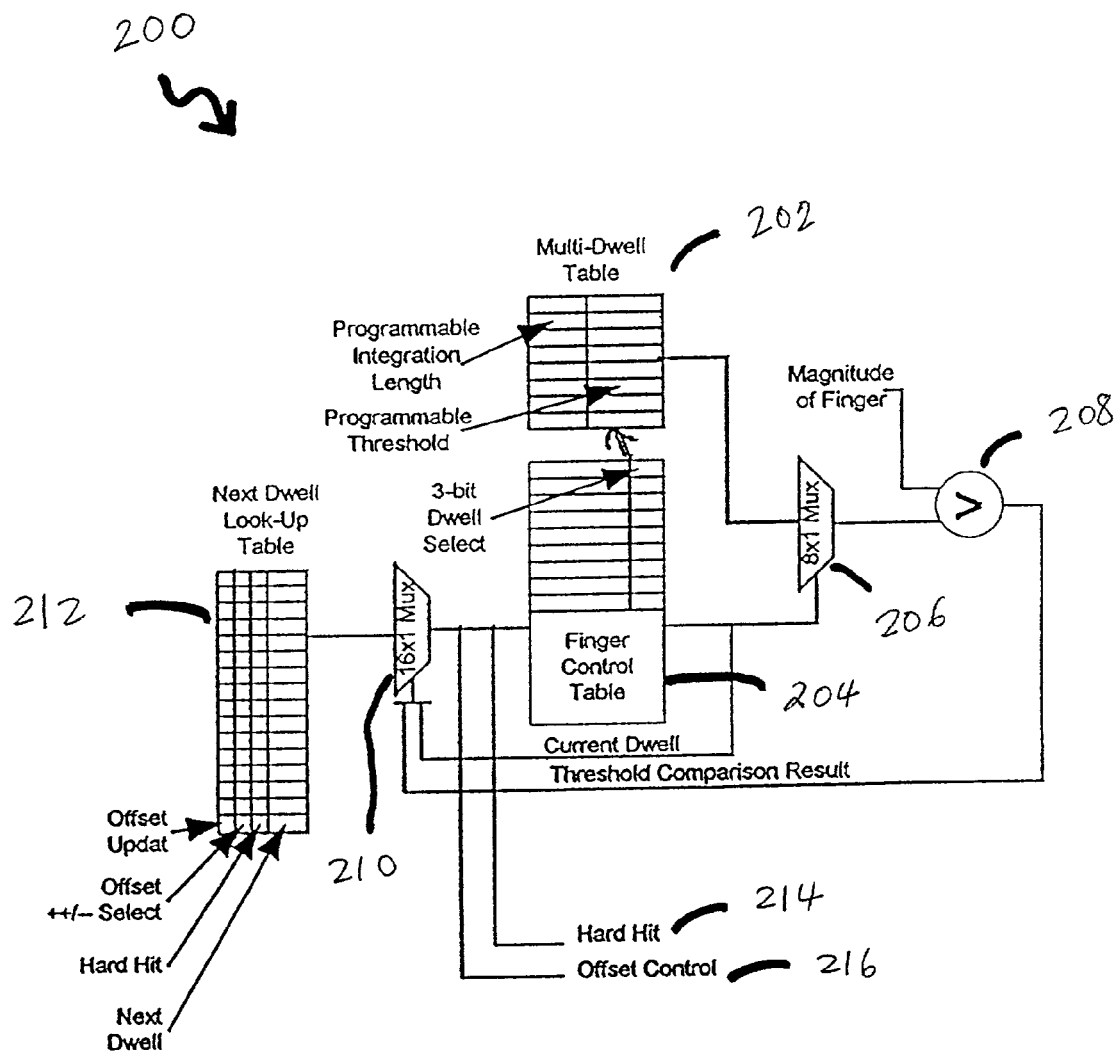
FIG. 2 is a block diagram of a configurable multi-dwell search engine in accordance with an embodiment of the invention.

FIG. 2 illustrates an exemplary configurable multi-dwell search engine 200. In an exemplary embodiment, the search engine 200 is part of a searcher (not shown) for conducting search functions in the base band processor 106 of a spread spectrum system. The configurable multi-dwell search engine 200 includes a multi-dwell table 202, a finger control table 204, an 8×1 multiplexer 206, a comparator 208, a 16×1 multiplexer 210, and a next dwell look-up table 212. In an exemplary embodiment, the search engine 200 provides an output hard hit signal 214 and an output offset control signal 216 to other parts of the searcher, such as external searcher controllers for controlling finger allocation, search offset, and other functions.

In an exemplary embodiment, the search engine 200 is programmable to function as a state machine having three look-up tables and two multiplexers for performing state machine functions.

The next dwell look up table 212 includes four columns of bits, namely, the offset update bits, the offset select bits, the hard hit bits, and the next dwell bits. In an exemplary embodiment, the number of rows in the next dwell look up table 212 correlates to the number of virtual fingers in the spread spectrum system. The offset update bits contain offset update information for each finger. The offset select bits contain information regarding the direction of a search in a given code space (i.e., incrementing or decrementing within the code space) for each finger. The hard hit bits contain information that indicates which dwell state should be an exit state for each finger. The next dwell bits contain the next dwell/state for each finger. In an exemplary embodiment, information contained in the next dwell look up table 212 is programmable depending on the degree of flexibility desired for a given spread spectrum system.

The finger control table 204 includes two columns of bits, namely, the context information bits and the dwell select bits. In an exemplary embodiment, the number of rows in the finger control table 204 corresponds to the number of virtual fingers in the spread spectrum system. The context information bits contain current dwell/state information regarding each finger. The dwell select bits contain 3-bit information for each finger at a given dwell/state that serves as an address to the appropriate row in the multi-dwell table 202. By having access to the multi-dwell table 202 via the dwell select bits, storage requirements in the finger control table 204 are greatly minimized because the integration length and threshold values for each state of each finger does not have to be stored in the finger control table 204. In an exemplary embodiment, information contained in the finger control table 204 is updated by information from the next-dwell look up table 212 via the 16×1 mux 210.

The multi-dwell table 202 includes two columns of bits, namely, the programmable integration length and the programmable threshold value at various states. In an exemplary embodiment, the number of rows in the multi-dwell table 202 is dependent on the number of states it is supporting. Thus, the more states it supports, the more flexibility is provided at a higher cost, and vice versa. In one embodiment, the number of rows in the multi-dwell table 202 may correlate with the number of next dwell/state available for each finger in the next dwell look up table 212. However, in another embodiment, the multi-dwell table 202 is independent of the next dwell look up table 212. In an exemplary embodiment, the integration length and threshold values are pre-selected/pre-defined and programmed into the multi-dwell table 202. The variable integration lengths and thresholds for each dwell/state enables search support under varying environmental conditions.

For a given finger, the finger control table 204 outputs the current state information into the 8×1 mux 206. The associated dwell select bits for that finger are used to retrieve the appropriate integration length and threshold value from the multi-dwell table 202 for the current state to be outputted into the 8×1 mux 206. The 8×1 mux 206 selects from the inputs an energy estimate and then inputs the selected energy estimate into the comparator 208. The comparator 208 compares the energy estimate to a magnitude of finger value and outputs a threshold comparison result. The threshold comparison result as well as the current state information from the finger control table 204 are fed back into the select nodes of the 16×1 mux 210. The input nodes to the 16×1 mux 210 receive inputs from the next dwell look-up table 212.

Based upon the received signals at the select nodes and input nodes, the 16×1 mux 210 selectively determines whether a virtual finger should be advanced to a next state or should remain in the same state. In an exemplary embodiment, if the threshold comparison result is positive, the finger is advanced to the next state. If the threshold comparison result is negative, the finger remains in its current state. If the finger is to be advanced to the next state, the next state information from the next dwell look-up table 212 is written into the current state information space in the finger control table 204 for that finger.

In addition to determining whether the finger should be advanced to the next state, the 16×1 mux 210 outputs control signals such as the hard hit signal 214 and the offset control signal 216 for controlling other components of the searcher. In an exemplary embodiment, the hard hit signal 214 is provided to an external controller that performs finger allocation functions. In one embodiment, the hard hit signal 214 is used to signal a higher layers of search control or to place certain virtual fingers into a tracking state. In another embodiment, the hard hit signal 214 provides an exit condition for a virtual finger to exit out of a state and return to a reset state.

In an exemplary embodiment, the offset control signal 216 is provided to a searcher controller to initiate the next offset of search, for example, to initiate a slew of the code space by another chip of time and restart code integration. In one embodiment, the offset control signal 216 provides the timing to update to a next state. For ease of explanation, only two output control signals are illustrated in FIG. 2.

This invention provides a configurable multi-dwell search engine. State machines in exemplary embodiments of this engine are programmable, thus, they significantly improve flexibility in defining dwell algorithms. In addition, variable thresholds and integration lengths enable search support under different environmental conditions. Multiple searcher support can be accommodated with minimal hardware overhead. Further, a multi-dwell algorithm in accordance with embodiments of this invention can be performed in realtime, thus, minimizing bandwidth requirements. In sum, this invention provides greater flexibility to the system designer to mix and match internal resources to achieve the optimum acquisition performance required by spread spectrum based mobile handsets and base stations.

Figure 3:
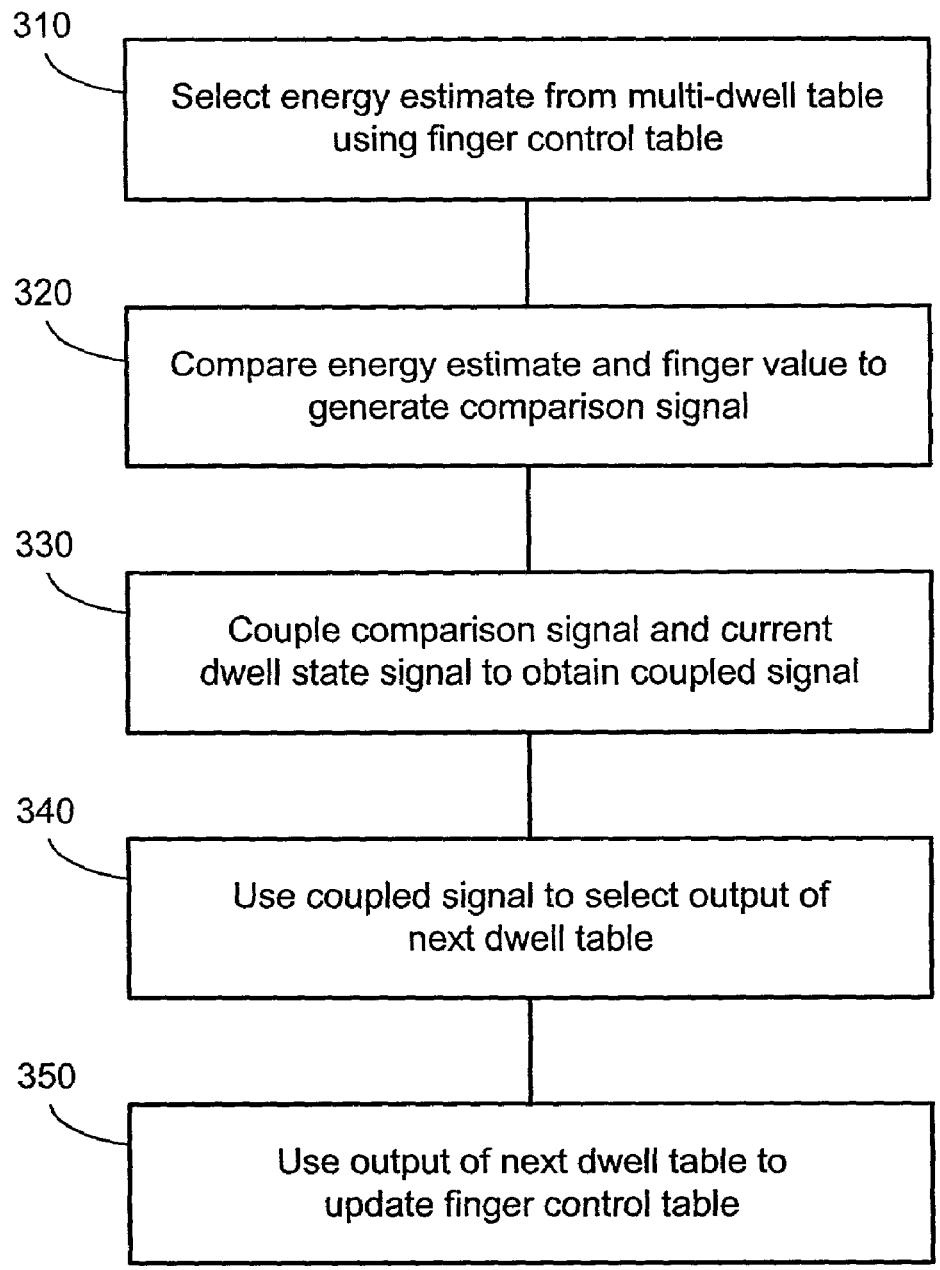
FIG. 3 is a flow chart of an exemplary process in accordance with an embodiment of the invention.

FIG. 3 illustrates an exemplary process in accordance with an embodiment of the invention. As shown therein, the process comprises the steps of selecting an energy estimate from a multi-dwell table using a finger control table (step 310), comparing the selected energy estimate and a finger value to generate a comparison signal (step 320), coupling the comparison signal and a current dwell state from the finger control table to obtain a coupled signal (step 330), using the coupled signal to select an output of a next dwell table (step 340), and using the output of the next dwell table to update the finger control table (step 350).

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. An apparatus for performing searches of a known code sequence space in a spread spectrum system, comprising:
a multi-dwell table for storing energy estimates, wherein said multi-dwell table is a look-up table including programmable integration length and threshold information for a programmable set of states;
a finger control table that selects an energy estimate output from said multi-dwell table;
a comparator that compares said energy estimate output from said multi-dwell table to a magnitude of finger value to generate a threshold comparison result; and
a next dwell table,
wherein said threshold comparison result is used to select a next state output from said next dwell table for input to said finger control table.

2. The apparatus of claim 1, wherein said next dwell table includes next dwell information for a set of virtual fingers in said spread spectrum system.

3. The apparatus of claim 1, wherein said plurality of output control signals include a hard hit signal and an offset control signal.

4. An apparatus for performing searches of a known code sequence space in a spread spectrum system, comprising:
   a multi-dwell table for storing energy estimates;
   a finger control table that selects an energy estimate output from said multi-dwell table, wherein said finger control table is a look-up table including context information and dwell select information for a set of virtual fingers in said spread spectrum systems;
   a comparator that compares said energy estimate output from said multi-dwell table to a magnitude of finger value to generate a threshold comparison result; and
   a next dwell table, wherein said threshold comparison result is used to select a next state output from said next dwell table for input to said finger control table.

5. An apparatus for performing searches of a known code sequence space in a spread spectrum system, comprising:
   a multi-dwell table for storing energy estimates;
   a finger control table that selects an energy estimate output from said multi-dwell table;
   a comparator that compares said energy estimate output from said multi-dwell table to a magnitude of finger value to generate a threshold comparison result;
   a next dwell table, wherein said threshold comparison result is used to select a next state output from said next dwell table for input to said finger control table; and
   a multiplexer which includes select nodes and input nodes, wherein said select nodes receive a current state input from said finger control table and said threshold comparison result from said comparator.

6. An apparatus for performing searches of a known code sequence space in a spread spectrum system, comprising:
   a multi-dwell table for storing energy estimates;
   a finger control table that selects an energy estimate output from said multi-dwell table;
   a comparator that compares said energy estimate output from said multi-dwell table to a magnitude of finger value to generate a threshold comparison result;
   a next dwell table, wherein said threshold comparison result is used to select a next state output from said next dwell table for input to said finger control table; and
   a multiplexer which includes select nodes and input nodes, wherein said input nodes receive next dwell information from said next dwell table.

7. A method for performing searches of a known code sequence space in a spread spectrum system, comprising the steps of:
   selecting an energy estimate from a multi-dwell table using current dwell state information in a finger control table;
   generating a threshold comparison signal;
   coupling said threshold comparison signal and a current dwell state signal to obtain a coupled signal;
   using said coupled signal to select an output from a next dwell table;
   applying the output from the next dwell table to the finger control table to update current dwell state information; and
   outputting a hard hit signal from the next dwell table to an external controller for controlling finger allocation.

8. A method for performing searches of a known code sequence space in a spread spectrum system, comprising the steps of:
   selecting an energy estimate from a multi-dwell table using current dwell state information in a finger control table;
   generating a threshold comparison signal;
   coupling said threshold comparison signal and a current dwell state signal to obtain a coupled signal;
   using said coupled signal to select an output from a next dwell table; and
   applying the output from the next dwell table to the finger control table to update current dwell state information; and
   outputting an offset control signal from the next dwell table to a searcher control for initiating a next search offset.

* * * * *